United States Patent
Woo et al.

(10) Patent No.: US 9,306,207 B2
(45) Date of Patent: Apr. 5, 2016

(54) METHOD OF FABRICATING SULFUR-INFILTRATED MESOPOROUS CONDUCTIVE NANOCOMPOSITES FOR CATHODE OF LITHIUM-SULFUR SECONDARY BATTERY

(71) Applicant: Hyundai Motor Company, Seoul (KR)

(72) Inventors: Hee Jin Woo, Gyeonggi-do (KR); Hee Yeon Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 14/086,178

(22) Filed: Nov. 21, 2013

(65) Prior Publication Data

US 2014/0186522 A1     Jul. 3, 2014

(30) Foreign Application Priority Data

Dec. 28, 2012   (KR) .................. 10-2012-0156061
Sep. 26, 2013   (KR) .................. 10-2013-0114197

(51) Int. Cl.
| | | |
|---|---|---|
| *B05D 5/12* | (2006.01) | |
| *H01M 4/04* | (2006.01) | |
| *H01M 4/1397* | (2010.01) | |
| *H01M 4/58* | (2010.01) | |
| *H01M 4/62* | (2006.01) | |

(52) U.S. Cl.
CPC .......... *H01M 4/0416* (2013.01); *H01M 4/0404* (2013.01); *H01M 4/1397* (2013.01); *H01M 4/581* (2013.01); *H01M 4/624* (2013.01); *H01M 4/626* (2013.01); *Y02E 60/122* (2013.01); *Y02P 70/54* (2015.11)

(58) Field of Classification Search
USPC .......... 427/113, 115; 429/213, 218.1, 231.95, 429/235, 236
See application file for complete search history.

(56) References Cited

U.S. PATENT DOCUMENTS

2003/0113624 A1*   6/2003   Kim et al. ................. 429/213
2004/0047798 A1    3/2004   Oh et al.

(Continued)

FOREIGN PATENT DOCUMENTS

| KR | 10-2003-0051143 | 6/2003 |
| KR | 10-2004-0026207 A | 3/2004 |
| KR | 10-2005-0052275 A | 6/2005 |
| KR | 10-2008-0063196 | 7/2008 |
| WO | 2012-064702 A2 | 5/2012 |

*Primary Examiner* — Brian K Talbot
(74) *Attorney, Agent, or Firm* — Mintz Levin Cohn Ferris Glovsky and Popeo, P.C.; Peter F. Corless

(57) ABSTRACT

Disclosed is method of fabricating sulfur-infiltrated mesoporous conductive nanocomposites for a cathode of a lithium-sulfur secondary battery, whereby a cathode material having a relatively high content of sulfur is fabricated and a high energy density in a lithium-sulfur secondary battery is realized, including: a) performing thermal treatment on sulfur particles in a reactor at a high temperature to melt the sulfur particles; b) adding a mesoporous conductive material in macroscale to a sulfur solution in the reactor; c) pressurizing the mesoporous conductive material in macroscale in the reactor so that the mesoporous conductive material in macroscale is completely immersed in the sulfur solution, and then maintaining the pressurized and molten state; d) cooling the sulfur particles and the mesoporous conductive material in macroscale so that sulfur within pores of the mesoporous conductive material in macroscale is crystallized; and e) grinding sulfur-infiltrated mesoporous conductive composites to fabricate sulfur-infiltrated mesoporous conductive nanocomposites.

13 Claims, 3 Drawing Sheets

(56) References Cited

U.S. PATENT DOCUMENTS

| | | |
|---|---|---|
| 2011/0052998 A1 | 3/2011 | Liang et al. |
| 2011/0206992 A1* | 8/2011 | Campbell et al. ............ 429/235 |
| 2013/0224594 A1* | 8/2013 | Yushin et al. ............. 429/218.1 |
| 2013/0330619 A1* | 12/2013 | Archer et al. ................. 429/213 |
| 2014/0186695 A1* | 7/2014 | Moganty et al. ............. 429/188 |

* cited by examiner und to sulfur particles that are adjacent on the surface of a conductive material. The sulfur particles are thus reduced to $S_8^{2-}$ and are dissolved in an electrolyte.

METHOD OF FABRICATING SULFUR-INFILTRATED MESOPOROUS CONDUCTIVE NANOCOMPOSITES FOR CATHODE OF LITHIUM-SULFUR SECONDARY BATTERY

CROSS-REFERENCE TO RELATED PATENT APPLICATION

This application claims the benefit of Korean Patent Application No. 10-2012-0156061 filed on Dec. 28, 2012 and Korean Patent Application No. 10-2013-0114197 filed on Sep. 26, 2013 in the Korean Intellectual Property Office, the disclosure of which is incorporated herein in its entirety by reference.

BACKGROUND OF THE INVENTION

1. Field of the Invention

The present invention relates to a cathode of a lithium-sulfur secondary battery, wherein the cathode is formed using a material having a relatively high content of sulfur, and methods for fabrication thereof. More particularly, the present invention provides a cathode formed from sulfur-infiltrated mesoporous conductive nanocomposites, which provides the lithium-sulfur secondary battery with a high energy density.

2. Description of the Related Art

Recently, chargeable/dischargeable secondary batteries have been widely used as large-capacity power storing batteries, such as those used in an electric vehicles and power saving systems, and as small-sized high-performance energy sources for portable electronic devices, such as a mobile phone, a camcorder, and a laptop computer.

Lithium ion batteries as secondary batteries are beneficial in that they have a relatively high energy and a relatively large capacity per unit area compared to nickel-manganese batteries and nickel-cadmium batteries.

Also, since lithium ion batteries have a low magnetic discharge rate, a long life span and no storing effect, they are convenient to use and provide a long life-span.

However, the potential for using lithium ion batteries as batteries for next generation electric vehicles is limited because they have stability issues when overheated, a low energy density, and low output.

In order to solve the problems of the lithium ion batteries, there have been many studies directed towards developing lithium-sulfur secondary batteries or lithium-air secondary batteries that may realize a high output and a high energy density.

Lithium-sulfur secondary batteries use sulfur as a cathode active material, use lithium as an anode and provide 2500 Wh/kg, i.e., 5 times a theoretical energy density of existing lithium ion batteries. Thus, these lithium-sulfur secondary batteries are suitable for use as batteries for electric vehicles that require a high output and a high energy density.

Furthermore, an abundance of sulfur for use as the cathode active material in the lithium-sulfur secondary battery exists in the earth. As such, sulfur can be provided at a low price and is expected to provide good price stability.

However, the lifespan of lithium-sulfur secondary batteries can be reduced due to the effect of self-discharge that occurs due to a polysulfide shuttle.

FIG. 1 illustrates a mechanism in which a lithium-sulfur secondary battery is charged and discharged. Theoretically, when the lithium-sulfur secondary battery is discharged, electrons that are moved from a lithium anode (Li metal) are bound to sulfur particles that are adjacent on the surface of a conductive material. The sulfur particles are thus reduced to $S_8^{2-}$ and are dissolved in an electrolyte.

Subsequently, $S_8^{2-}$ constitutes long-chain polysulfide ($Li_2S_8$) that is bound to lithium ions and is dissolved in the electrolyte. $Li_2S_8$ is finally deposited in the form of short-chain polysulfide ($Li_2S_2/Li_2S$) on the surface of the lithium anode due to a continuous reduction reaction with the lithium ions.

When the lithium-sulfur secondary battery is charged, an oxidization reaction occurs, and $Li_2S_8$ is reduced to $S_8^{2-}$ after undergoing a reverse process. Thus, $S_8^{2-}$ loses electrons from the surface of the conductive material and is deposited as sulfur particles.

However, as illustrated in FIG. 1, a polysulfide shuttle phenomenon, in which $Li_2S_8$ reacts with the lithium ions during an oxidization reaction process from $Li_2S_2/Li_2S$ to $Li_2S_8$ and is reduced to $Li_2S_2/Li_2S$, occurs when the lithium-sulfur secondary battery is charged.

In the polysulfide shuttle phenomenon, a driving force is generated by a concentration gradient of polysulfide, which prevents a problem caused by an overvoltage of the lithium-sulfur secondary battery.

However, since self-discharge occurs continuously even when the lithium-sulfur secondary battery is charged, a problem relating to a reduction in the life-span of the lithium-sulfur secondary battery occurs. Thus, when the lithium-sulfur secondary battery is charged, the efficiency of a mass of an active material is lowered.

Thus, studies have been conducted in attempts to solve the problems caused by the polysulfide shuttle phenomenon in the development of lithium-sulfur secondary batteries. For example, studies have been conducted for improving discharge capacity and life-span characteristics of lithium-sulfur secondary batteries by infiltrating sulfur into pores of mesoporous conductive materials.

FIG. 2 illustrates a technique for using a mesoporous carbon in attempt to solve the problems caused by the polysulfide shuttle phenomenon of the lithium-sulfur secondary battery. As illustrated, sulfur-infiltrated mesoporous carbon nanocomposites are synthesized by infiltrating sulfur into micropores formed in a mesoporous carbon, and a charge/discharge mechanism thereof is demonstrated.

This mechanism shown in FIG. 2 is described in U.S. Patent Publication No. 2011-0052998. In particular, as described a mesoporous carbon having micropores is first synthesized and is etched using potassium hydroxide (KOH). Mesopores are formed in inner walls of the mesoporous carbon by performing the etching process. Thereafter, a solution in which carbon disulfide is dissolved, is mixed with the mesoporous carbon. Thermal treatment is then performed on the mixture at a nitrogen atmosphere of 140° C. so as to infiltrate sulfur into the mesopores.

When charge/discharge is performed using an electrode fabricated using the described method, sulfur infiltrated into the mesopores causes a reduction reaction by receiving electrons, and the sulfur is dissolved in the state of polysulfide $S_x^{2-}$.

The dissolved polysulfide is not diffused into an electrolyte, but is instead confined within the micropores and reacts with the lithium ions.

However, one problem of the described technique is a limitation in the quantity of infiltrated sulfur due to limitations on pore size and a distribution chart of the mesoporous conductive material (mesoporous carbon). As a result, it is difficult to implement a theoretical energy density with this method.

In other words, the quantity of sulfur that may be filtrated into the mesopores by the method illustrated in FIG. 2 is limited. Thus, the increase in energy density is very restricted by such use of sulfur in a battery for an electric vehicle.

Further, according to the described method, a highly-dispersed slurry should be fabricated using a nanoscale sulfur-mesoporous conductive material in order to fabricate an uniform electrode of a secondary battery. However, when the nanoscale sulfur-mesoporous conductive material is fabricated, a material yield and a supply and demand quantity thereof are very restrictive. Thus, it is difficult to use the mesoporous conductive material as an electrode of a battery for an electric vehicle.

Still further, the size of the mesoporous conductive material should be very small in order to provide micropores and mesopores. However, and when a nanoscale carbon material is fabricated, the material yield is low and thus, it is difficult to perform mass production.

SUMMARY OF THE INVENTION

According to one aspect, the present invention provides a method of fabricating sulfur-infiltrated mesoporous conductive nanocomposites for a cathode of a lithium-sulfur secondary battery. More particularly, the present invention provides such a method of fabrication whereby a cathode material having a relatively high content of sulfur compared to conventional sulfur-infiltrated mesoporous conductive nanocomposites is fabricated so as to provide a lithium-sulfur secondary battery having a high energy density.

According to a further aspect, the present invention provides a method of fabricating a cathode material for a lithium-sulfur secondary battery, whereby a battery for an electric vehicle is produced on a large scale by using a mesoporous conductive material that may be fabricated using a cheaper and simplified process compared to conventional processes which are expensive and complicated. As such, the cost of the lithium-sulfur secondary battery of the present invention is greatly reduced.

According to a further aspect of the present invention, there is provided a method of fabricating sulfur-infiltrated mesoporous conductive nanocomposites for a cathode of a lithium-sulfur secondary battery, the method including: a) performing thermal treatment on sulfur particles in a reactor at a high temperature so as to melt the sulfur particles; b) adding a mesoporous conductive material in macroscale to a sulfur solution in the reactor; c) pressurizing the mesoporous conductive material in macroscale in the reactor at an upper portion of the reactor so that the mesoporous conductive material in macroscale is completely immersed into the sulfur solution, and then maintaining the pressurized and molten state for a suitable period of time; d) cooling the sulfur particles and the mesoporous conductive material in macroscale so that sulfur injected into pores of the mesoporous conductive material in macroscale is crystallized; and e) grinding the sulfur-infiltrated mesoporous conductive composites after cooling so as to fabricate sulfur-infiltrated mesoporous conductive nanocomposites. According to various embodiments, methods of the present invention fabricates nanoscale composites with mesopores that maintain the same size or without significant change (i.e. the mesopores have a pre-treatment size that is the same as or approximately the same as post-treatment size). In particular, by using a grinding or pulverizing step for the formation of nanocomposites from the macro-scaled conductive materials having mesopores, the thus formed nanoscale composites maintain mesopore size.

Other aspects and exemplary embodiments of the invention are discussed infra.

BRIEF DESCRIPTION OF THE DRAWINGS

The above and other features and advantages of the present invention will become more apparent by describing in detail exemplary embodiments thereof with reference to the attached drawings in which.

Figure 1:
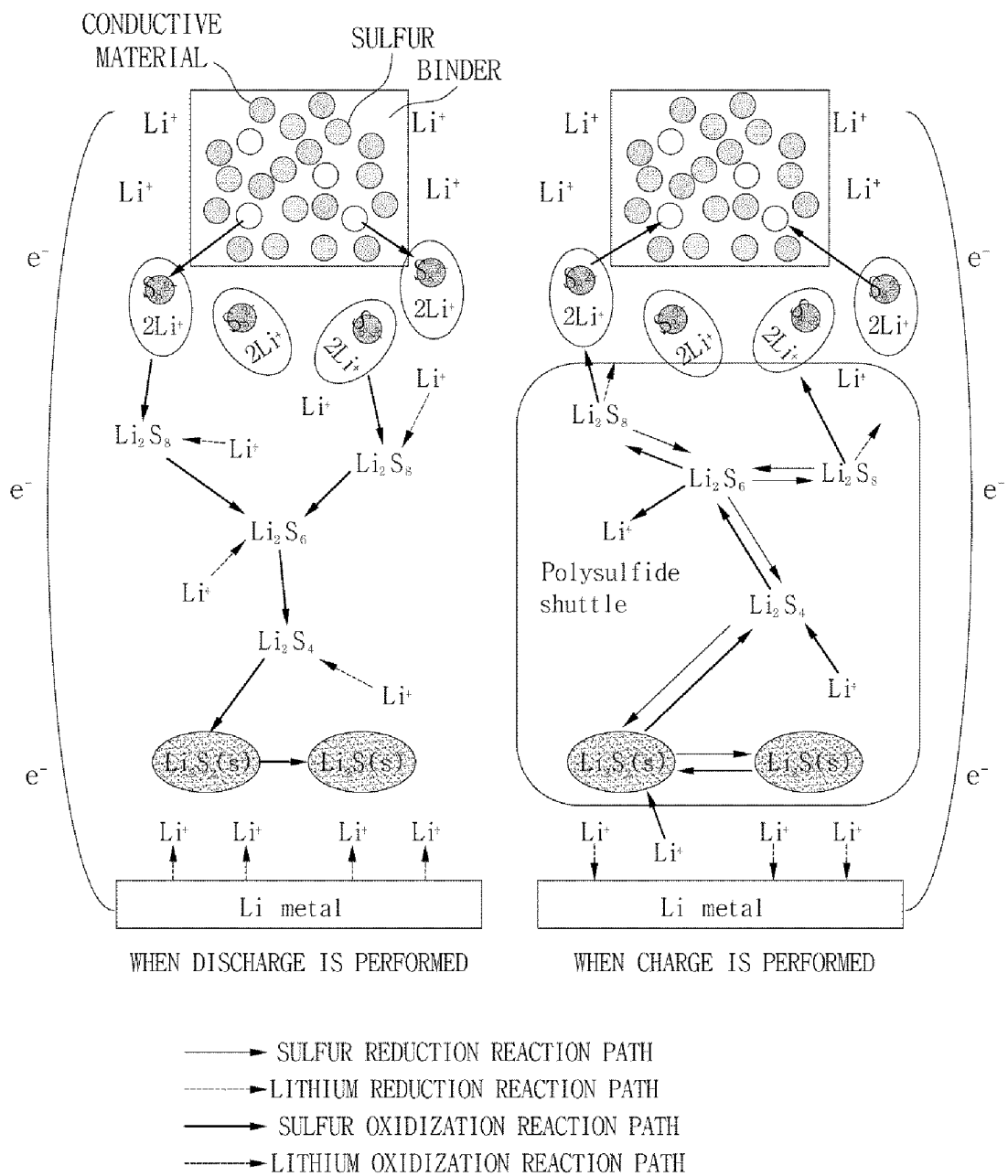
FIG. 1 is a conceptual view of an action mechanism when a lithium-sulfur secondary battery according to the related art is charged/discharged.
Figure 2:
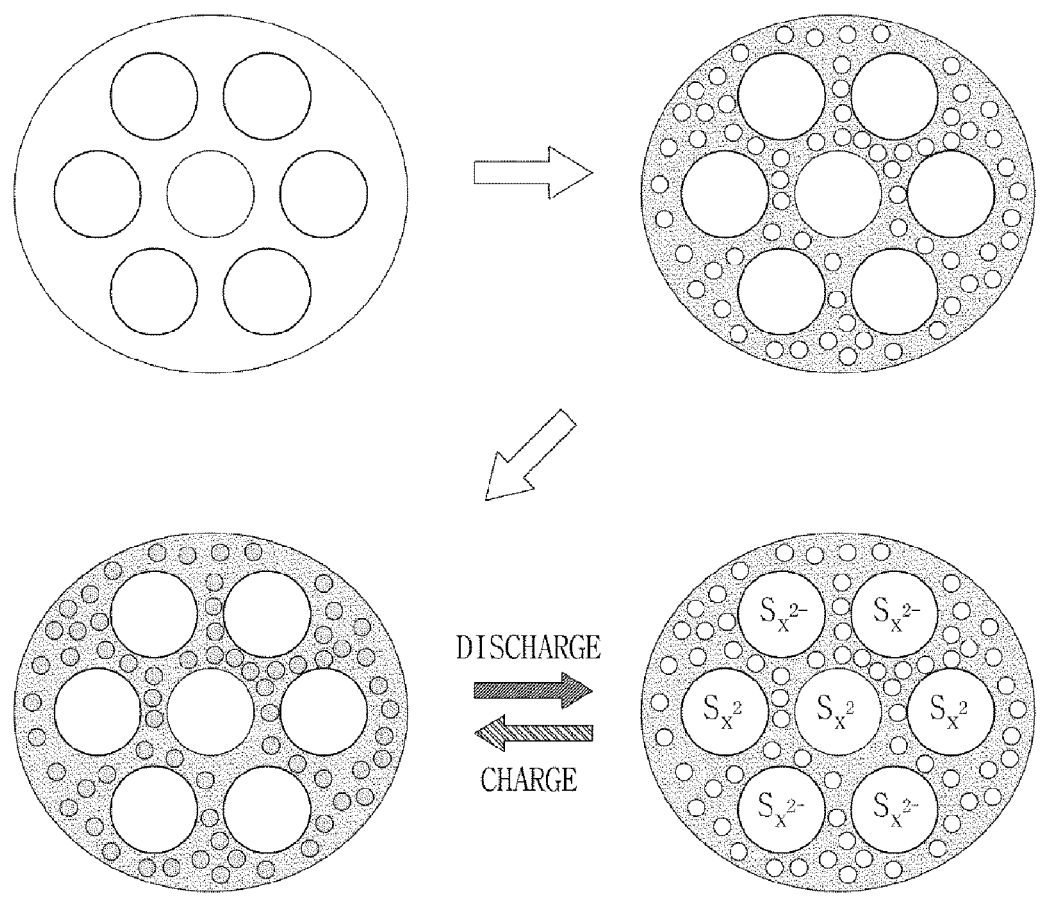
FIG. 2 illustrates sulfur-infiltrated mesoporous carbon nanocomposites that are synthesized by a conventional method of infiltrating sulfur into micropores formed in a mesoporous carbon, and a charge/discharge mechanism thereof.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

The present invention will now be described more fully with reference to the accompanying drawings, in which exemplary embodiments of the invention are shown so that one of ordinary skill in the art can easily embody the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention relates to a method of fabricating sulfur-infiltrated mesoporous conductive nanocomposites for a cathode of a lithium-sulfur secondary battery. According to preferred embodiments, sulfur-infiltrated mesoporous conductive nanocomposites are fabricated by applying shock energy to sulfur-infiltrated mesoporous conductive composites in which a large amount of sulfur is immersed is into a mesoporous conductive material in macroscale. The process can further be carried out, for example, by using a mechanical milling device, such as a ball mill, so as to grind the sulfur-infiltrated mesoporous conductive composites to a size less than a microscale (nanoscale or microscale).

Figure 3:
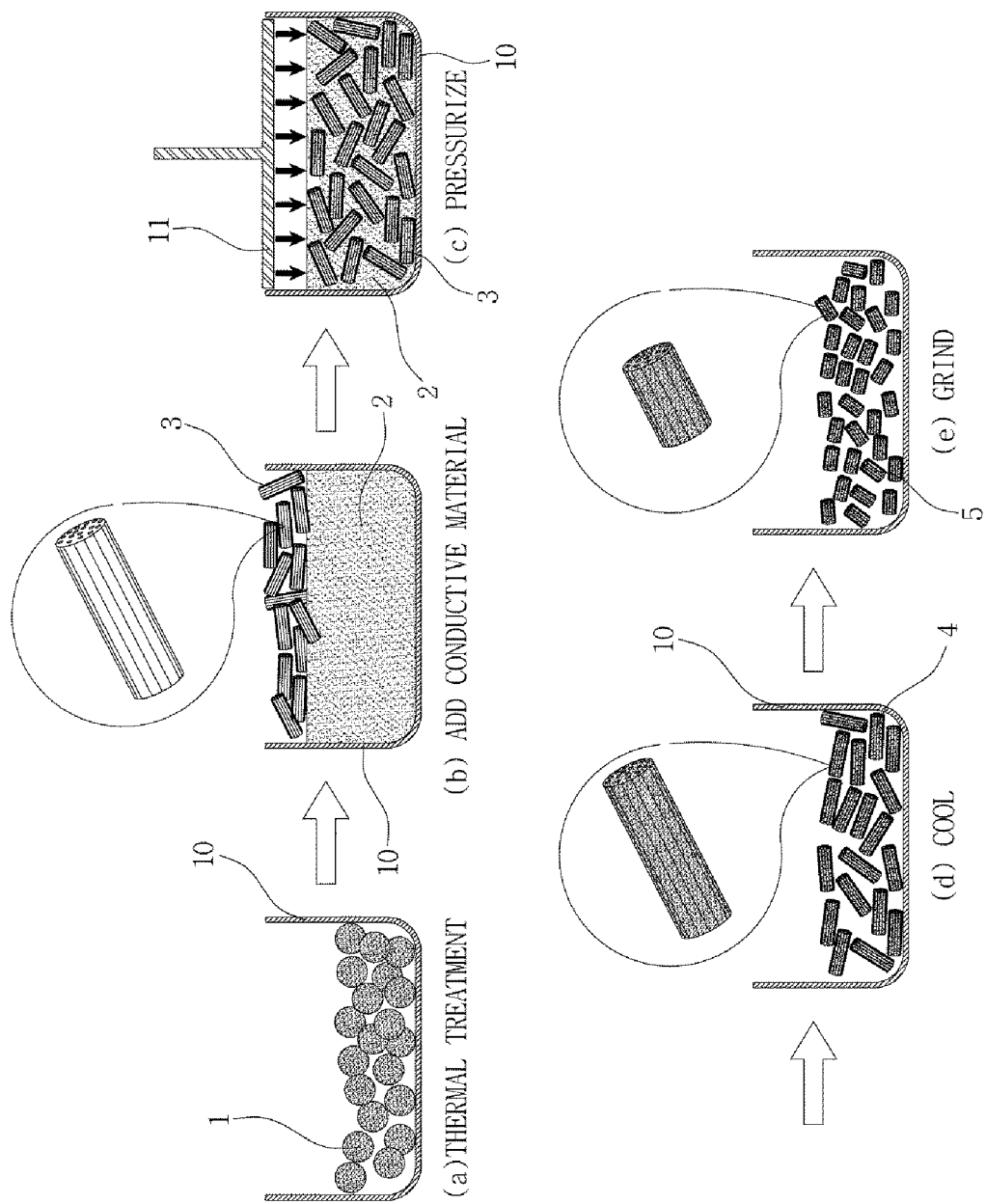
FIG. 3 is a schematic view of a method of fabricating sulfur-infiltrated mesoporous conductive nanocomposites for a cathode of a lithium-sulfur secondary battery according to an embodiment of the present invention.

FIG. 3 is a schematic view of a fabrication method according to an embodiment of the present invention. A method of fabricating highly-dispersed sulfur-infiltrated mesoporous conductive nanocomposites so as to solve the problems of the related art will be described with reference to FIG. 3.

First, as illustrated in (a) of FIG. 3, sulfur particles 1 are put in a reactor 10 that is heated at a high temperature. The "high temperature" is any suitable temperature that will result in melting of the sulfur particles 1. The sulfur particles 1 are, thus, heated and melted in the reactor 10 at the suitable high temperature.

In this case, the sulfur particles 1 are preferably slowly melted, after which time a sulfur solution 2 is added to the reactor 10 while stirred using a general stirring apparatus (not shown). The sulfur solution 2 is maintained in a molten state up to the temperature at which the viscosity of the sulfur solution 2 is high, preferably, up to about 120° C. to about 180° C., and more particularly, at about 155° C. which provides the sulfur solution 2 with the highest viscosity.

Here, if the temperature of the molten sulfur solution 2 is less than 120° C., the viscosity of the sulfur solution 2 is so low that sulfur will not uniformly infiltrate into pores of a mesoporous conductive material in macroscale 3 that will be further described below. On the other hand, if the temperature of the molten sulfur solution 2 is higher than 180° C., process costs increase excessively due to unnecessary thermal treatment costs. Thus, it is preferred to maintain the temperature no greater than 180° C.

Subsequently, as illustrated in FIG. 3(b), the mesoporous conductive material in macroscale 3 is added to the sulfur solution 2 that has been melted in the reactor 10, followed by sealing the reactor.

As referred to herein, the mesoporous conductive material in macroscale 3 means a porous conductive material having a bulk size, e.g., a diameter (or length) in the range of a micrometer (μm) to millimeter (mm) size, and having 10 to 90% porosity (i.e. volume of voids relative to total volume of the material) or air porosity.

Here, if the mesoporous conductive material in macroscale 3 has a bulk diameter that is smaller than the size in units of micrometer (μm), then fabrication costs and processing time of the mesoporous conductive material in macroscale 3 undesirably increase. On the other hand, when the mesoporous conductive material in macroscale 3 has a bulk diameter that is greater than the size in units of millimeter (mm), efficiency is lowered during a post-processing grinding process and, thus, such size is not preferable.

According to various embodiments, a porous carbon material or a porous metal material having micropores may also be used as the above-described mesoporous conductive material in macroscale 3.

Alternatively, most metal or metal compound that exists on the periodic table, or a conductive polymer material may be used as the above-described mesoporous conductive material in macroscale 3. In detail, a material formed of a single element from among materials that exist in a lithium group (IA-group), a beryllium group (IIA-group), a scandium group (IIIB-group), a titanium group (IVB-group), a vanadium group (VB-group), a chrominum group (VIB-group), a manganese group (VIIB-group), an iron group (VIIIB-group), a cobalt group (VIIIB-group), a nickel group (VIIIB-group), a copper group (IB-group), a zinc group (IIB-group), a boron group (IIIA-group), and a carbon group (IVA-group), or an alloy formed of one or more of these materials may be used as the above-described mesoporous conductive material in macroscale 3.

Alternatively, a material formed of a single element from among materials that exist in the lithium group, the beryllium group, the scandium group, the titanium group, the vanadium group, the chrominum group, the manganese group, the iron group, the cobalt group, the nickel group, the copper group, the zinc group, the boron group, and the carbon group, or a semiconductor formed of one or more of these materials may be used as the above-described mesoporous conductive material in macroscale 3.

Alternatively, a linear polymer or a copolymer of the linear polymer material may be used as the above-described mesoporous conductive material in macroscale 3.

Here, the linear polymer may be carbon and linear-backbone "polymer blacks" including carbon, and examples of the linear polymer include polyacetylene, polypyrrole, or polyaniline.

Also, the mesoporous conductive material may have a spherical shape, a rod shape, a needle shape, a plate shape, a tubular shape, or a bulk shape. After the mesoporous conductive material in macroscale 3 is added to the reactor 10 as described above, in order to allow molten sulfur to be uniformly injected into pores of the mesoporous conductive material in macroscale 3, as illustrated in (c) of FIG. 3, inert gas (e.g., argon (Ar)) is injected into the mesoporous conductive material in macroscale 3 in a state where the reactor 10 is sealed at an upper portion of the reactor 10. The mesoporous conductive material in macroscale 3 is then pressurized for a predetermined amount of time.

That is, after a large amount of the mesoporous conductive material in macroscale 3 is added to the sulfur solution 2, the mesoporous conductive material in macroscale 3 having a relatively low density is pressurized from the top of the reactor so that the mesoporous conductive material in macroscale 3 can be completely immersed in the sulfur solution 2 and then maintained in this state for a long time.

In this case, in order to allow the mesoporous conductive material in macroscale 3 to be well mixed with the sulfur solution 2, and to allow the sulfur solution 2 to be uniformly and sufficiently infiltrated into the pores of mesoporous conductive material in macroscale 3, the inert gas can be injected into the mesoporous conductive material in macroscale 3 by using a gas injector 11 that seals the reactor 10 from the upper portion of the reactor 10. As such, the mesoporous conductive material in macroscale 3 in the reactor 10 (also, the inert gas that is injected into the mesoporous conductive material in macroscale 3) is pressurized in a desired range, preferably in the range of about 1 to 100 bar.

Further, the molten state and pressurized state of the sulfur solution 2, within which the mesoporous conductive material in macroscale 3 is added, is maintained at a suitable thermal treatment temperature, preferably a temperature of about 120° C. to about 180° C. for about 5 to 48 hours.

Here, when the mesoporous conductive material in macroscale 3 is pressurized by a pressure of less than 1 bar as a pressurizing condition, the pressure applied to the mesoporous conductive material in macroscale 3 is lower than an atmospheric pressure, and a capillary force is not generated in the pores of the mesoporous conductive material in macroscale 3. On the other hand, when the mesoporous conductive material in macroscale 3 is pressurized by pressure that exceeds 100 bar, costs associated with the pressurizing process unnecessarily increase and thus, such pressures are not preferable.

Also, when a thermal treatment retaining time in the pressurized state is less than 5 hours, molten sulfur is not completely injected into the pores of the mesoporous conductive material in macroscale 3. On the other hand, when the thermal treatment retaining time in the pressurized state exceeds 48 hours, cost associated with the thermal treatment process unnecessarily increase and thus, such retaining times are not preferable.

As illustrated in FIG. 3(d), after the mesoporous conductive material in macroscale 3 is put in the sulfur solution 2 and then the pressurizing process and the thermal treatment process are performed, the mesoporous conductive material in macroscale 3 and the sulfur particles 1 are slowly cooled and they are maintained in a stable state. Preferably, the mesoporous conductive material in macroscale 3 and the sulfur particles 1 are slowly cooled to a room temperature so that sulfur injected into the macroporous mesoporous conductive material in macroscale 3 is crystallized in a natural cooling state.

Thereafter, the thus formed solid-state sulfur-infiltrated mesoporous conductive composites 4 are ground to a desired size. In particular, the solid-state sulfur-infiltrated mesoporous conductive composites 4 are preferably ground to a size that is equal to or less than a microscale (nanoscale or micro scale). Such grinding can be carried out by any suitable grinding method, such as by shock energy applied to the solid-state sulfur-infiltrated mesoporous conductive composites 4 by using a ball mill method. As a result of the grinding, atomized sulfur-infiltrated mesoporous conductive nanocomposites 5 are formed.

The sulfur-infiltrated mesoporous conductive composites may have pores that are about the same size as pores of the macroscale mesoporous conductive material.

In this case, in order to atomize the solid-state sulfur-infiltrated mesoporous conductive composites 4, the solid-state sulfur-infiltrated mesoporous conductive composites 4 can be mixed with a zirconia ball (e.g., having a diameter of 5 mm) by using a planetary miller, and then ground at about 100 to 1000 rpm for about 1 to 48 hours, thereby fabricating highly-dispersed sulfur-infiltrated mesoporous conductive nanocomposites 5.

Here, when rotation speed is not within the above range, powder atomization uniformity and milling efficiency are undesirably lowered. Further, when a grinding time is not within the above range, powder atomization uniformity and milling efficiency are undesirably lowered.

As described above, the present invention provides a method of fabricating sulfur-infiltrated mesoporous conductive nanocomposites for a cathode of a lithium-sulfur secondary battery. Using the sulfur-infiltrated mesoporous conductive nanocomposites 5 of the present invention as a cathode active material, an electrode of the lithium-sulfur secondary battery can be fabricated.

In particular, after the sulfur-infiltrated mesoporous conductive nanocomposites 5 are mixed with a binder and a solvent and are fabricated in the state of a slurry, the fabricated mixed slurry can be coated on a metal electrode and then dried to thereby form a cathode of the lithium-sulfur secondary battery where sulfur, the conductive material, and binder exist together as the cathode active material.

According to various embodiments, polyvinylidene fluoride (PVDF) or polyvinylidene fluoride-co-hexafluoro propylene (PVDF-co-HFP) may be used as the binder. Further, the solvent may be one or more selected from the group consisting of N,N-methylpyrrolidone (NMP), dimethylformamide (DMF), and dimethylacetamide (DMAC).

According to various embodiments, sulfur, the conductive material, and the binder are used in amounts of about 50 to 80 parts by weight, about 15 to 45 parts by weight, and about 5 to 20 parts by weight, respectively, based on 100 parts by weight of the entire cathode active material.

In addition, in this case, the solvent is preferably used in an amount of bout 500 parts by weight based on 100 parts by weight of the cathode active material. Hereinafter, the present invention will be described in greater detail based on an exemplary embodiment; however, aspects of the present invention are not limited thereto.

First, in order to fabricate sulfur-infiltrated mesoporous conductive nanocomposites, 200 g of sulfur particles were put in a reactor and were slowly melted up to 155° C. at which the viscosity of a sulfur solution is the highest, and then stirred.

Thereafter, 45 g of a macroporous carbon material ($S_{BET}$: 1400 m$^2$/g, $V_{Tot}$: 1.62 cc/g, length: 3 μm) was added to the sulfur solution, and then the reactor was sealed.

Subsequently, inert gas, (i.e., Ar) was injected into the reactor so as to inject molten sulfur into pores of the macroporous carbon material, and then the inert gas, (i.e., Ar) was pressurized up to 20 bar, and maintained therein for 10 hours (temperature maintained at 155° C.) so that thermal treatment could be performed.

Subsequently, after the macroporous carbon material and the sulfur particles were slowly cooled up to a room temperature so that sulfur within the mesoporous conductive material in macroscale was crystallized in the macroporous carbon material, in order to atomize sulfur-infiltrated mesoporous carbon composites having a bulk size, the sulfur-infiltrated mesoporous carbon composites were mixed with a zirconia ball (5 mm) in a planetary miller and then ground at 300 rpm for 5 hours. As a result, 240 g of highly-dispersed sulfur-infiltrated mesoporous carbon composites was fabricated.

Next, the prepared sulfur-infiltrated mesoporous carbon composites were mixed with a PVDF binder, thereby fabricating an electrode of a lithium-sulfur secondary battery.

As described above, in a method of fabricating sulfur-infiltrated mesoporous conductive nanocomposites for a cathode of a lithium-sulfur secondary battery according to the present invention, a cathode material having a relatively high content of sulfur compared to sulfur-infiltrated mesoporous conductive nanocomposites according to the related art is fabricated, and a high energy density in a lithium-sulfur secondary battery is realized.

Also, according to the present invention, a mesoporous conductive material in macroscale that may be fabricated using a cheaper and more simplified process, as compared to an expensive and complicated conventional process of fabricating a mesoporous conductive material in nanoscale, is used so that the entire fabrication process can be simplified, mass synthesis can be performed, and a battery for an electric vehicle can be easily fabricated.

Thus, the battery for an electric vehicle can be produced on a large scale, and the cost of the battery can be greatly reduced.

Furthermore, since a three-dimensional network structure is provided in which composites have pores, lithium polysulfide is not confined to be dispersed within the outside due to the three-dimensional network structure. As such, a polysulfide shuttle phenomenon and problems caused thereby can be avoided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating sulfur-infiltrated mesoporous conductive nanocomposites for a cathode of a lithium-sulfur secondary battery comprising:
    a) performing thermal treatment on sulfur particles in a reactor at a high temperature so as to melt the sulfur particles;
    b) adding a mesoporous conductive material in macroscale to a sulfur solution in the reactor;
    c) pressurizing the mesoporous conductive material in macroscale in the reactor at an upper portion of the reactor so that the mesoporous conductive material in macroscale is completely immersed in the sulfur solution, and then maintaining the pressurized and molten state, wherein the mesoporous conductive material in macroscale is pressurized in a range of about 1 to 100 bar of pressure and maintained in a pressurized state for about 5 to 48 hours;
    d) cooling the sulfur solution and the mesoporous conductive material in macroscale so that sulfur within pores of the mesoporous conductive material in macroscale is crystallized to form sulfur-infiltrated mesoporous conductive composites; and
    e) grinding the sulfur-infiltrated mesoporous conductive composites after cooling so as to fabricate sulfur-infiltrated mesoporous conductive nanocomposites, wherein the sulfur-infiltrated mesoporous conductive composites are mixed with a zirconia ball by using a planetary miller and then ground at about 100 to 1000 rpm for about 1 to 48 hours,
    wherein a temperature of the sulfur solution in the reactor in which the sulfur particles are melted in a) through c) is maintained at about 120° C. to about 180° C.; and
    wherein the mesoporous conductive material in macroscale comprises a porous conductive material having a bulk diameter in a range of micrometer (μm) to millimeter (mm), and having about 10 to 90% porosity or air porosity.

2. The method of claim 1, wherein a temperature of the sulfur solution in the reactor in which the sulfur particles are melted in (a) through (c) is maintained at about 155° C.

3. The method of claim 1, wherein, after the mesoporous conductive material in macroscale is added to the sulfur solution in the reactor, the mesoporous conductive material in macroscale is pressurized at the upper portion of the reactor by injecting gas when the reactor is in a sealed state into pores of the mesoporous conductive material in macroscale by using a gas injector.

4. The method of claim 1, wherein the mesoporous conductive material in macroscale is a porous carbon material or a porous metal material having micropores.

5. The method of claim 1, wherein after cooling, the sulfur-infiltrated mesoporous composites are ground by using a ball mill method so that the sulfur-infiltrated mesoporous conductive nanocomposities are atomized to a nanoscale or microscale.

6. The method of claim 1, wherein the sulfur-infiltrated mesoporous conductive composites have pores that are about the same size as pores of the macroscale mesoporous conductive material.

7. The method of claim 1, wherein the macroscale mesoporous conductive material is a porous carbon material or a porous metal material having micropores.

8. The method of claim 1, wherein the macroscale mesoporous conductive material is a material formed of a single element from among materials that exist in a lithium group (IA-group), a beryllium group (IIA-group), a scandium group (IIIB-group), a titanium group (IVB-group), a vanadium group (VB-group), a chrominum group (VIB-group), a manganese group (VIIB-group), an iron group (VIIIB-group), a cobalt group (VIIIB-group), a nickel group (VIIIB-group), a copper group (IB-group), a zinc group (IIB-group), a boron group (IIIA-group), and a carbon group (IVA-group), or an alloy formed of one or more of the materials.

9. The method of claim 1, wherein the macroscale mesoporous conductive material is a material formed of a single element from among materials that exist in a lithium group (IA-group), a beryllium group (IIA-group), a scandium group (IIIB-group), a titanium group (IVB-group), a vanadium group (VB-group), a chrominum group (VIB-group), a manganese group (VIIB-group), an iron group (VIIIB-group), a cobalt group (VIIIB-group), a nickel group (VIIIB-group), a copper group (IB-group), a zinc group (IIB-group), a boron group (IIIA-group), and a carbon group (IVA-group), or a semiconductor formed of one or more of the materials.

10. The method of claim 1, wherein the macroscale mesoporous conductive material is a linear polymer or a copolymer of the linear polymer.

11. The method of claim 10, wherein the linear polymer is polyacetylene, polypyrrole, or polyaniline.

12. The method of claim 1, wherein the macroscale mesoporous conductive material has a spherical shape, a rod shape, a needle shape, a plate shape, or a tubular shape.

13. A method of fabricating a cathode material for a lithium-sulfur secondary battery, the method comprising:
    mixing the sulfur-infiltrated mesoporous conductive nanocomposites fabricated in accordance with claim 1 with a binder and a solvent so as to fabricate a mixed slurry; and
    coating the mixed slurry on a metal electrode and drying the mixed slurry.

* * * * *